(12) United States Patent
Tan

(10) Patent No.: US 8,165,982 B2
(45) Date of Patent: Apr. 24, 2012

(54) METHOD AND APPARATUS FOR LIMITING HOW RULE COMPONENTS CAN BE MODIFIED USING TAG DEFINITIONS AND VERBS

(75) Inventor: It-Beng Tan, Redwood City, CA (US)

(73) Assignee: CA, Inc., Islandia, NY (US)

( * ) Notice: Subject to any disclaimer, the term of this patent is extended or adjusted under 35 U.S.C. 154(b) by 856 days.

(21) Appl. No.: 12/130,429

(22) Filed: May 30, 2008

(65) Prior Publication Data

US 2009/0299949 A1 Dec. 3, 2009

(51) Int. Cl.
*G06F 17/00* (2006.01)
(52) U.S. Cl. .......................................................... 706/47
(58) Field of Classification Search .............. 706/45–48; 707/694, 665, 783, 784; 717/100, 110, 120, 717/168
See application file for complete search history.

(56) References Cited

U.S. PATENT DOCUMENTS

| | | | | |
|---|---|---|---|---|
| 5,265,221 A | * | 11/1993 | Miller | 711/163 |
| 7,953,688 B2 | * | 5/2011 | Sadeh | 706/47 |
| 2002/0032638 A1 | * | 3/2002 | Arora et al. | 705/37 |
| 2002/0138582 A1 | * | 9/2002 | Chandra et al. | 709/206 |
| 2002/0147726 A1 | * | 10/2002 | Yehia et al. | 707/101 |
| 2004/0117765 A1 | * | 6/2004 | Chan | 717/117 |
| 2007/0288412 A1 | * | 12/2007 | Linehan | 706/45 |
| 2008/0177768 A1 | * | 7/2008 | Salim et al. | 707/100 |
| 2008/0281768 A1 | * | 11/2008 | Sadeh | 706/47 |

* cited by examiner

*Primary Examiner* — David Vincent

(74) *Attorney, Agent, or Firm* — Schwegman, Lundberg & Woessner, P.A.

(57) ABSTRACT

Various embodiments herein include one or more of systems, methods, data structures, and software operable to limit how rules, or components thereof, may be modified. Some embodiments include receiving a rule definition in a system, the rule definition including one or more rule components, each component including a reference to one or more values from which an inference is made when the rule is applied. Such embodiments further include associating one or more rule components with one or more tag definitions that limit how the one or more associated rule components are modifiable by one or more rule administrators. The rule definition and the associations of tag definitions to the rule components may then be stored in a data store.

20 Claims, 11 Drawing Sheets

RULE A
    IF
        PROGRAM = {GOLD, SILVER, BRONZE, ECONOMICAL}
    THEN
        DISCOUNT = 10%

```
<RULE A>...
    <PROGRAM>...
        <GOLD, SILVER, BRONZE, ECONOMICAL>...
            <DISCOUNT>...
                <10%>...
```

RULE A.1
    IF
        PROGRAM = {GOLD, SILVER, BRONZE, ECONOMICAL}
        TAG INFER *STATE RULE_BASE_X*
        TAG SELECT *ONLY* {GOLD, SILVER} IF INFER STATE = CA
    THEN
        DISCOUNT = 10%  — 502

```
<RULE A.1>...                                                      — 504
    <PROGRAM>...
        <GOLD, SILVER, BRONZE, ECONOMICAL><TAG INFER STATE
        RULE_BASE_X>...
            <TAG SELECT ONLY GOLD, SILVER IF INFER STATE = CA>
            <DISCOUNT>...
                <10%>...
```

FIG. 5

RULE_BASE_X                                                        — 602
    IF X=Y THEN STATE=NY
    IF X=Z THEN STATE=IA
    IF X=Z AND W=Z THEN STATE=CA

FIG. 6

RULE FINDER — 700

| RULE NAME | EDITABLE | PERMISSIONS |
|---|---|---|
| POLICY DISCOUNT | Y | CRWD |
| POLICY APPROVE | Y | R |
| POLICY MODIFICATION | Y | R |
| POLICY PREMIUM | Y | RWD |

FIG. 7

RULE EDITOR — 800

Policy Discount [10%, 11%, 12%, 13%, 14%, 15%] — 802 if Program = [PLATINUM, GOLD, SILVER, BRONZE, ECONOMICAL, FAMILY] — 804

TAG — 806

FIG. 8

METHOD AND APPARATUS FOR LIMITING HOW RULE COMPONENTS CAN BE MODIFIED USING TAG DEFINITIONS AND VERBS

BACKGROUND INFORMATION

Expert systems are often used to solve problems in fields involving large numbers of interacting rules. An example of expert systems is a medical system specifying the symptoms of a patient with possible diagnoses. A collection of rules used by such systems is often referred to as a rule base or a knowledge base. Domain specialists, such as doctors, working in conjunction with knowledge engineers, typically write a rule base. Development tools employing graphical user interfaces are utilized to code the logic into individual rules, and the resulting rule base is deployed with an inference engine as a service to the expert system. During runtime, data representative of symptoms and lab reading results are entered into input fields of the rule base and an inference session is initiated. The inference session applies rules of the rule base to generate and present a result in output fields.

Typically, a rule base development cycle is a write-once and run-many scenario. However, more advanced and specialized rule bases often evolve from their initial versions. Such proliferation of rule bases entails corresponding complexity in the development tools to maintain the ongoing efforts. In some instances, more than one individual or group may use a particular rule of a rule base and modification of such a rule by one individual may disrupt use of the rule by others. In other instances, a rule of a rule base may be subject to organizational policies or restrictions. In such instances, certain modifications to rules should be limited or prevented entirely.

SUMMARY

Various embodiments include one or more of systems, methods, data structures, and software operable to limit how rules in an expert system, or components thereof, may be modified. Various embodiments herein include one or more of systems, methods, data structures, and software operable to limit how rules, or components thereof, may be modified. Some embodiments include receiving a rule definition in a system, the rule definition including one or more rule components, each component including a reference to one or more values from which an inference is made when the rule is applied. Such embodiments further include associating one or more rule components with one or more tag definitions that limit how the one or more associated rule components are modifiable by one or more rule administrators. The rule definition and the associations of tag definitions to the rule components may then be stored in a data store.

Some embodiments include retrieving a rule definition and associated tag definitions from the data store as a function of a query including an identifier of a rule administrator and instantiating the rule definition in a rule editor user interface. Such embodiments may further modify user interface controls of rule components displayed in the rule editor user interface according to respective associated tag definitions. The modifying of the user interface controls, in some embodiments, includes implementing the limits of the associated tag definitions on how rule components may be modified by the rule administrator.

BRIEF DESCRIPTION OF THE DRAWINGS

FIG. 5 is a rule illustration including tags according to an example embodiment.

FIG. 6 is a rule illustration according to an example embodiment.

FIG. 7 is a user interface illustration according to an example embodiment.

FIG. 8 is a user interface illustration according to an example embodiment.

DETAILED DESCRIPTION

Figure 1:
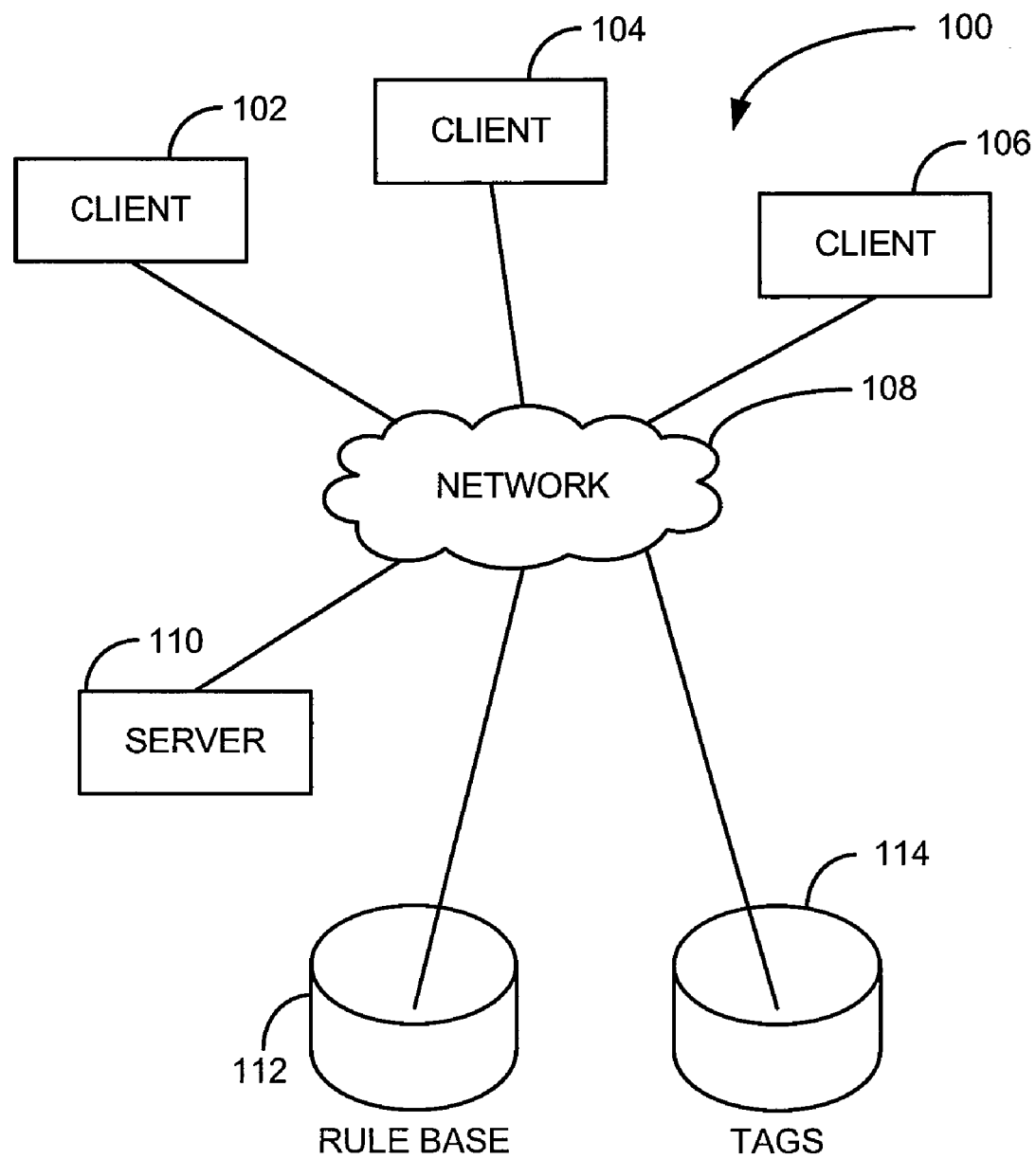
FIG. 1 is a block diagram of a networked computing environment according to an example embodiment.

Rules within a rule base may be written and modified by rule authors having various permission levels. For example, a senior level rule author may have authority to write and modify all rules, while a lower level rule author may have lesser permissions and only be able make select modifications to certain rules. In an example embodiment, as will be described in detail below, a corporate level underwriter at an insurance company may author one or more rules dealing with insurance programs available in certain states. The corporate level underwriter may author rules limiting which programs are available in certain states and even limit available discounts. A state specific rule author, such as a state specific underwriter, may author extension of these rules, but the limits authored by the corporate level underwriter prevent the state level underwriter from authoring contradictory rules or modifying existing rules which may contradict corporate level policies.

Some such embodiments are implemented using tags within rules of rule bases. A tag typically includes a verb that specifies how one or more user interface controls may be modified. The tags may be conditionally applied to modify the user interface controls based on other tags or other rules. As a result, if a particular rule author is limited in how a particular rule may be authored or modified, the rule authoring user interface is modified as a function of one or more tags to prevent the user interface from allowing the rule author selecting, or otherwise authoring, rules which are not permitted. Note that tags limit how rules may be modified and not how rules are applied or used within an expert system. The subject matter of this application is primarily directed to a rule authoring environment and not a run-time environment within which the rules are applied. Various example embodiments are described in detail below with reference to the figures.

In the following detailed description, reference is made to the accompanying drawings that form a part hereof, and in which is shown by way of illustration specific embodiments in which the inventive subject matter may be practiced. These embodiments are described in sufficient detail to enable those skilled in the art to practice them, and it is to be understood that other embodiments may be utilized and that structural, logical, and electrical changes may be made without departing from the scope of the inventive subject matter. Such embodiments of the inventive subject matter may be referred to, individually and/or collectively, herein by the term "invention" merely for convenience and without intending to limit the scope of this application to any single invention or inventive concept if more than one is in fact disclosed.

The following description is, therefore, not to be taken in a limited sense, and the scope of the inventive subject matter is defined by the appended claims.

The functions or algorithms described herein are implemented in hardware, software or a combination of software and hardware in one embodiment. The software comprises computer executable instructions stored on computer readable media such as memory or other type of storage devices. Further, described functions may correspond to modules, which may be software, hardware, firmware, or any combination thereof. Multiple functions are performed in one or more modules as desired, and the embodiments described are merely examples. The software is executed on a digital signal processor, ASIC, microprocessor, or other type of processor operating on a system, such as a personal computer, server, a router, or other device capable of processing data including network interconnection devices.

Some embodiments implement the functions in two or more specific interconnected hardware modules or devices with related control and data signals communicated between and through the modules, or as portions of an application-specific integrated circuit. Thus, the exemplary process flow is applicable to software, firmware, and hardware implementations.

FIG. 1 is a block diagram of a networked computing environment 100 according to an example embodiment. The networked computing environment 100 includes one or more clients 102, 104, 106 that communicate with a server 110 and one or more databases 112, 114 over a network 108. The clients 102, 104, 106, in some embodiments, may be virtually any type of computing device, such as personal computers, handheld computing devices, and other similar devices. In other embodiments, the clients 102, 104, 106 are applications that communicate over the network 108, such as web browsing applications. The network 108 is a system which allows data to be exchanged between the clients 102, 104, 106, the server 110, and the databases 112, 114. The network may include one or more of a local area network, a wide area network, a storage area network, the Internet, and other network types. The connections to the network 108 may include wired, wireless, optical, and other connections types that facilitate data communication over the network 108.

The databases 112, 114 maybe one or more data stores such as databases, files, or other persistent media or data structures. The databases 112, 114 may be resident on the server 110, one or more of the clients 102, 104, 106, or on dedicated database host computing devices. The databases 112, 114 include a rule base database 112 and a tags database 114. The rule base database 112 includes rules that are operable within an expert system for making decisions. The tags database 114 includes tags that may be authored to limit how rules in the rule base database 112 may be modified.

In some embodiments, client 102, 104, 106 users may create, read, update, and delete rules and tags stored in the databases 112, 114. In some embodiments, the clients 102, 104, 106 may directly access the databases 112, 114, such as through use of a rule and tag authoring application resident on the clients 102, 104, 106. In other embodiments, the clients 102, 104, 106 may access the databases 112, 114 via the server 110, such as in a web-based embodiment. In such embodiments, the server 110 may include one or more of a web server and an application server process configured to perform various rule and tag functions. In either type of embodiment, either the server 110 or the client 102, 104, 106 resident applications include an inference engine that is operative to apply tags retrieved from the tag database 114 to determine how a user interface of such applications needs to be modified, if necessary, to limit how rules retrieved from the rule base database 112, or otherwise authored, may be modified.

Figure 2:
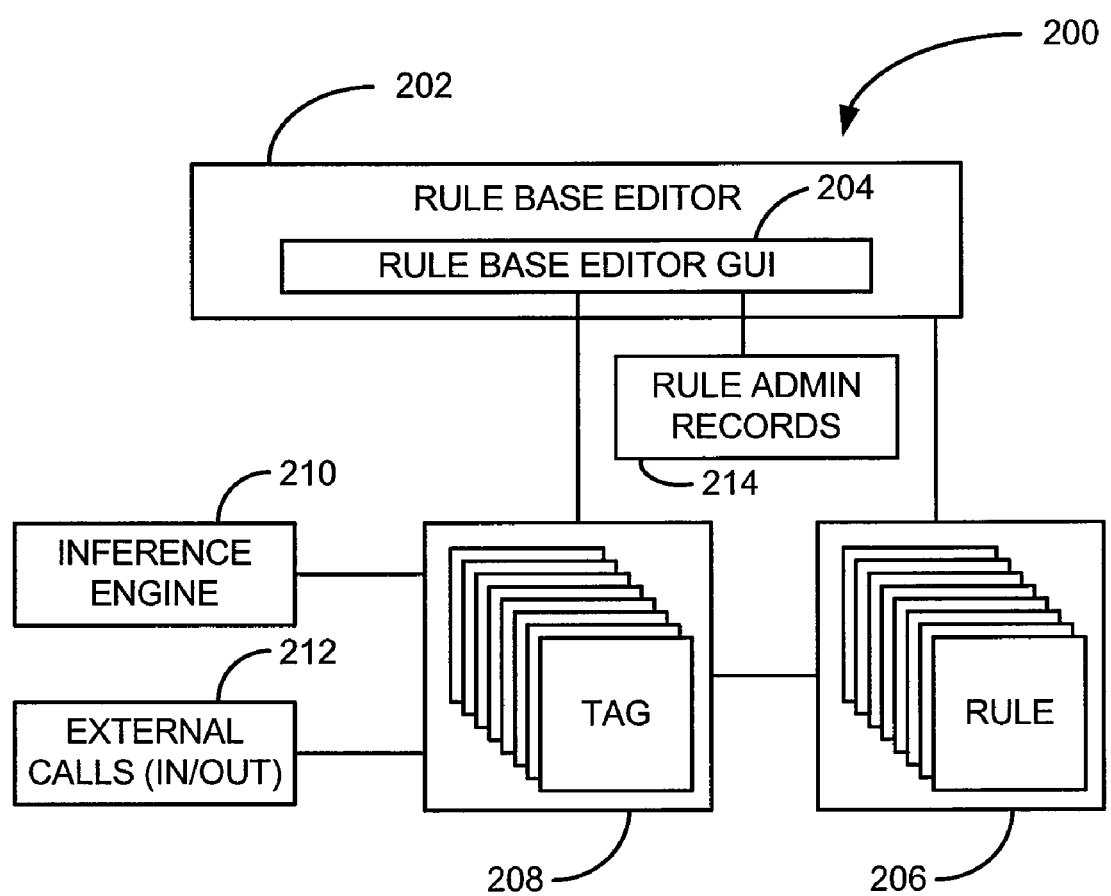
FIG. 2 is a logical block diagram of a system according to an example embodiment.

FIG. 2 is a logical block diagram of a system 200 according to an example embodiment. The system 200 includes a rule base editor application 202 which provides a rule base editor graphical user interface 204 through which a user may create, read, update, and delete rules in a rule base 206 used by an expert system. The rule base editor graphical user interface 204 is also functional to allow a user to create, read, update, and delete tags in a tag database 208 and to associate tags to elements of rules in the rule base 206 to limit how elements of rules may be modified and who may make such modifications.

In some embodiments, tags in the tag database 208 may be authored to limit who may modify or author rules in the rule base 206. Such tags may be conditional based on user credentials in a set of rule administration records 214. The rule administration records 214 may exist for the specific purpose of use with tags in the tag database 208, but may alternatively be user credential records that exist within a computing environment of an organization. Rule administration records may identify specific users and may group users by roles, workgroups, or other groupings depending on the particular embodiment. A tag in the tag database 208 may be linked to a rule administration record 214 of one or more users or to a role, workgroup, or other group of one or more users. For example, a tag may be linked to a tag that designates a first privilege level for a first group of users, such as corporate rule architects, and to a second privilege level for a second group of users, such as workgroup rule administrators. In one such embodiment, a rule in the rule base 206 may be linked to a tag in the tag database 208 that allows the first group of users to make virtually any change to the rule, such as setting a range of acceptable premium levels for insurance policies in the rule, while the tag prevents the second group of users from modifying the rule to allow premium levels for insurance policies outside of the acceptable range pre-determined by the first group of users.

Tags in the tag database 208, in some embodiments, may include programmatic calls to functions and processes 212 external to the tags. The tags may also receive external calls 212, in some embodiments, to allow external processes and functions to leverage functionality of the tags in the tag database 208.

In some embodiments, tags in the tag database 208 may be authored to include programmatic inferences which are processed by an inference engine 210. Such inferences may include determining modifications a user is limited to or prevented from making. For example, a tag may set a range of acceptable values that must be within a certain percentage of an average of values that already exist for a particular field. The tag in such embodiments may identify the field and designate the percentage. Upon inferring the acceptable range of values, a user interface within the rule base editor graphical user interface 204 will be modified to prevent the user from selecting a value in the rule outside of the acceptable range. Other tags may be used in conjunction or in other embodiments. Further examples of such rules are described below with regard to FIG. 3.

Figure 3:
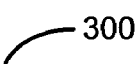
FIG. 3 is an illustration of a list of data structures of tags according to an example embodiment.

FIG. 3 is an illustration of a list of data structures 300 of tags according to an example embodiment. The data structure 300 includes a listing of defined tags that may be associated with rules in a rule base. The tags include a verb type, verb data, and effects. A verb type identifies the type of tag. The verb data identifies how a tag modifies data values within a rule editor user interface. The effects designate actions that occur because of the tag.

There may be numerous verb types, depending on the particular embodiment. The verb types included in the data structure 300 include a LOCK which will cause a user interface control identified in the effects column to be locked, or prevented from manipulation. A HIDE verb type causes a user interface control in the effects column to be hidden. A SELECT verb type designates a restricted selection. The verb data may include a range of acceptable values and may include a default value. The effects column of a SELECT verb may include code which may be used to infer the range and/or default values. An ASSIGN verb type may include an expression which when applied to a rule editor user interface component, assigns a value to the component. There may also be a code element which may be used to infer the value to assign. An INFER verb type may be used to infer values for one or more user interface controls. A CODE verb type may include a code element to modify portions of a rule editor user interface, stored data, or other data processing action related to a rule to which such a tag is associated. A REFERENCE verb type may include a link to an external web service or other external function or process. A USER verb type is a free-form, generic tag that may be used for various purposes as needed in a particular embodiment.

Tags of the various verb types may be combined in association to a rule or portion of a rule. An INFER verb type tag, for example, may be used to infer a value which may be fed to a SELECT verb type to set a range of acceptable values or a default value. In another example, an INFER verb type tag may be used to determine a privilege level of a particular user. Then other verb type tags may be conditionally applied based on a result of the INFER verb type tag. Examples of how such tags may be associated with a rule are illustrated and described with reference to FIG. 4, FIG. 5, and FIG. 6.

Figure 4:
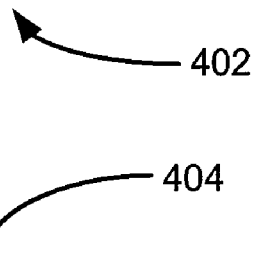
FIG. 4 is a rule illustration according to an example embodiment.

FIG. 4 is a rule illustration according to an example embodiment. The rule illustration includes a rule pseudo code listing 402 and a portion 404 of how such a rule may be represented in eXtensible Markup Language ("XML") when stored. The rule includes a listing of programs: GOLD, SILVER, BRONZE, and ECONOMICAL. If the program is of one of the identified programs, the discount is set at ten percent. If the program is not of one of the identified programs, the rule does not apply.

FIG. 5 is a rule illustration including tags according to an example embodiment. The rule in the rule illustration is the same rule as illustrated and described with regard to FIG. 4, but the rule also includes two tags. As in FIG. 4, FIG. 5 includes a pseudo code portion 502 and a representation of how such a rule and the tags may be represented in XML when stored.

The tags included in the rule in FIG. 5 include an INFER verb type tag and a SELECT verb type tag that is conditionally applied in the event the INFER verb type tag results in a state equal to CA. Note that the INFER verb type tag calls RULE_BASE_X. RULE_BASE_X is illustrated in FIG. 6. RULE_BASE_X 602 is a set of rules that may be applied to determine a state. RULE_BASE_X 602 may be retrieved and processed by an inference engine 210 as illustrated and described with regard to FIG. 2. RULE_BASE_X 602 instead may be code included within another tag, such as an INFER verb type tag which will provide a similar result. The option to use INFER type verb tags or making calls to other rules or other external functions, web services, and processes provides additional programmatic capabilities and allows for leveraging of existing processes. Such flexibility, in some embodiments, reduces the need for redevelopment of multiple code segments that provide the same results.

The rule illustration of FIG. 5 in conjunction with RULE_BASE_X 602 of FIG. 6, when implemented, will determine if the ten percent discount applies and the tags, when applied, will determine if the state is CA. If the state is CA, the rule editor user interface through which the rule is being viewed will be modified according to the tags to limit selection of a program to one of GOLD and SILVER.

FIG. 7 is a user interface 700 illustration according to an example embodiment. The user interface 700 is a user interface which may be used to view a listing of rules in a rule base. The listing may also present data representative of properties of the particular listed rules. A rule may be selected within the user interface 700 to view further details of the rule, and depending on the rule, the user, and the permissions of the user in view of the rule and tags associated therewith, the rule may be edited.

FIG. 8 is a user interface 800 illustration according to an example embodiment. The user interface 800 is a user interface that may be displayed upon selection of a rule within the rule finder user interface 700 of FIG. 7. The user interface 800 of FIG. 8 is a user interface that may allow a user to author or modify a rule. The rule presented in the user interface 800 is the rule illustrated and described with regard to FIG. 4. In such an embodiment, a policy discount may be declared based on one or more program types. In this instance, a policy discount of ten percent is selected in the percentage user interface control 802 if the program equals one of the GOLD, SILVER, BRONZE, OR ECONOMICAL programs selected in the program listing user interface control 804. The user interface 800 also includes a TAG action button 806 which may be selected to define and associate a tag to the rule. Selection of the TAG action button 806, in some embodiments, causes another user interface, such as is illustrated in FIG. 9, to be displayed to allow the user to define a tag.

Figure 9:
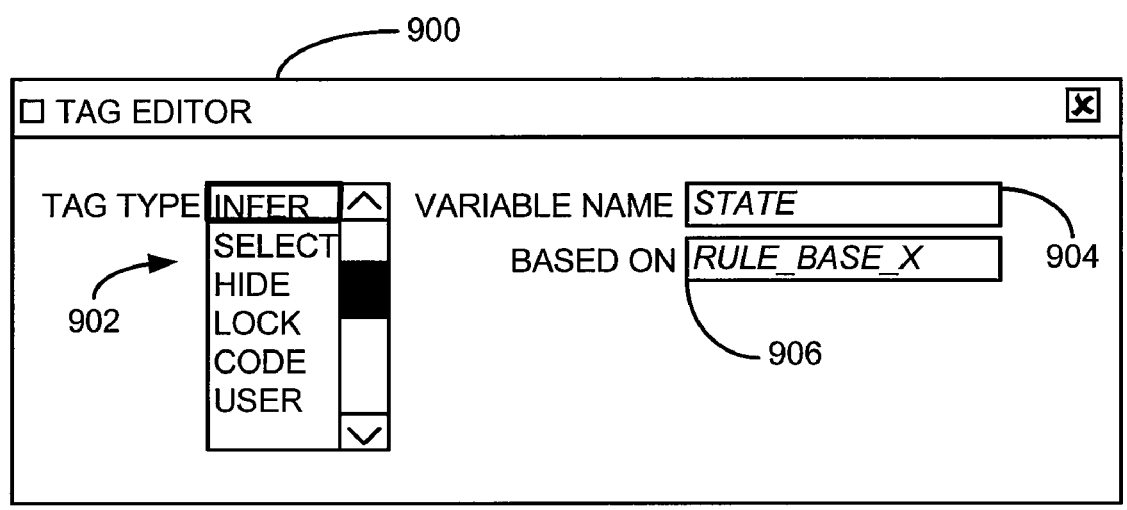
FIG. 9 is a user interface illustration according to an example embodiment.

FIG. 9 is a user interface 900 illustration according to an example embodiment. The user interface 900 provides mechanisms by which a user may define a tag. Saving a tag defined using the user interface may cause the tag to be stored in an associative manner with the rule to which the tag is being added. The user interface 900 include a tag type user interface control 902 from which the user may select the type of tag to define. Depending on the selection, other controls of the user interface 900 may be made visible, hidden, locked, or otherwise modified. For example, selection of the INFER tag type causes a variable name declaration field 904 to be displayed and a field 906 within which to specify how the inference is to be made. The variable name declaration field may be a text entry field that allows the user to declare a variable name. In this instance, the variable name is "STATE" which conforms to the INFER tag illustrated and described with regard to FIG. 5. Also in conformance with FIG. 5, the inference is declared to be based on "RULE_BASE_X" which is illustrated and described with regard to FIG. 5 and FIG. 6. The user interface 900 may also be used to define the SELECT tag illustrated and described in FIG. 5.

Figure 10:
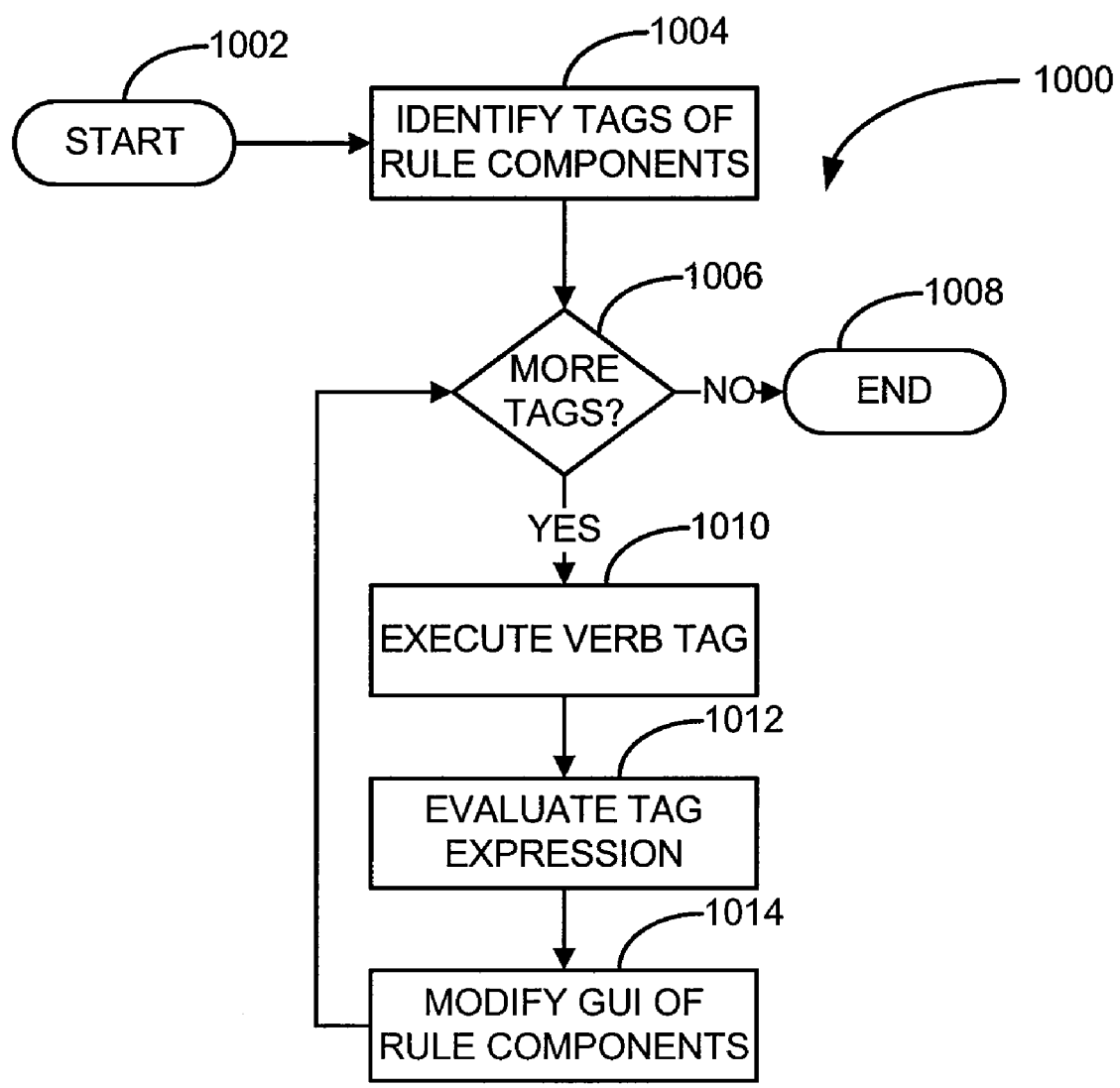
FIG. 10 is a block flow diagram of a method according to an example embodiment.

Once the tags are defined using the interface 900 of FIG. 9, the tags are stored as is the rule being authored or modified within the user interface 800 of FIG. 8. When that rule is subsequently opened in the user interface 800 of FIG. 8, the tags associated with the rule will be applied before the user interface 800 is displayed to determine if the user interface 800 should be modified. If so, the user interface 800 is modified, such as by limiting selectable or modifiable values, and the user interface 800 is rendered. For example, if the INFER and SELECT tags described above are applied, the tags will be evaluated and if the state is equal to CA, the program listing user interface control 804 will display only GOLD and SILVER. Otherwise, all of the values are displayed absent another tag to the contrary. FIG. 10 provides an example of such a method that modifies a rule editor user interface.

FIG. 10 is a block flow diagram of a method 1000 according to an example embodiment. The method starts 1002 and identifies 1004 tags of rule components until it is determined 1006 all tags have been processed by the method 1000, at which time the method 1000 ends 1008. Each tag is processed by executing 1010 the verb of the tag as the tag is defined. The tag expression may then be evaluated 1012 and a graphical user interface control of an associated rule component may be modified 1014. However, in some embodiments, a tag may not directly modify a graphical user interface control. An example of such a tag may be an infer tag. In such instances, an infer tag may provide a result which is then fed to another tag that may make a graphical user interface control modification 1014 based on the result.

Figure 11:
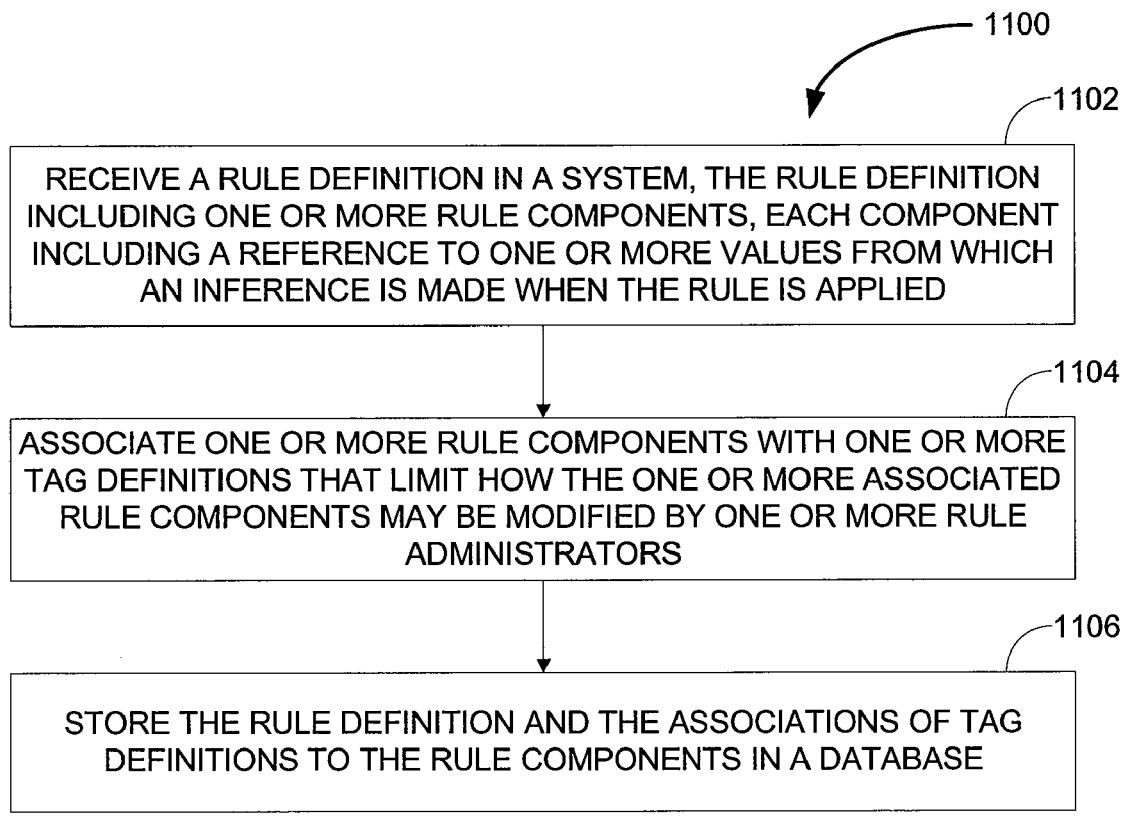
FIG. 11 is a block flow diagram of a method according to an example embodiment.

FIG. 11 is a block flow diagram of a method 1100 according to an example embodiment. The method 1100 is an example method that may be implemented to define and associate a tag with a rule. The method 1100 includes receiving 1102 a rule definition in a system. The rule definition may include one or more rule components, each component including a reference to one or more values from which an inference is made when the rule is applied. An example of such a rule is a rule that operable within an expert system to make or help make decisions within such a system.

The method 1100 further includes associating 1104 one or more rule components with one or more tag definitions that limit how the one or more associated rule components may be modified by one or more rule administrators and storing 1106 the rule definition and the associations of tag definitions to the rule components in one or more data stores such as databases, files, or other persistent media or data structures. In some embodiments, a rule component of the rule definition includes an association to two or more tag definitions. In some embodiments, application of one or more rule components or tags may be conditional based on a condition association of one or more rule components with one or more tag definitions. Such conditional associations may be made based on evaluated values, a result returned when making a call to an external process, or other mechanisms, values, or operations. In some embodiments, the rule definition, one or more tag definitions, and associations of tag definitions to rule components are stored 1106 in the database, in a markup language or other formats which associates rule display and modification functionality within a rule editor user interface.

Figure 12:
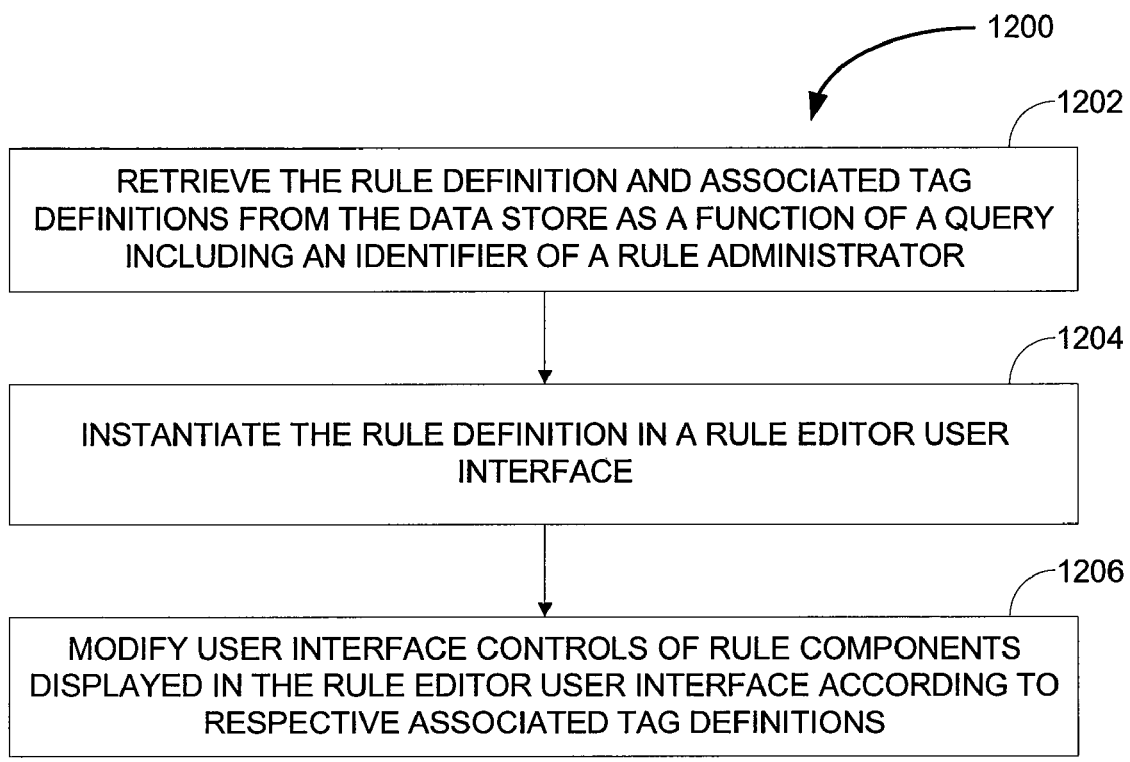
FIG. 12 is a block flow diagram of a method according to an example embodiment.

FIG. 12 is a block flow diagram of a method 1200 according to an example embodiment. The method 1200 is an example of a method that may be implemented when viewing a rule including one or more tags that limit how the rule may be modified. The method 1200 includes retrieving 1202 the rule definition and associated tag definitions from the one or more data stores such as databases, files, or other persistent media or data structures as a function of a query including an identifier of a rule administrator. The method 1200 further includes instantiating 1204 the rule definition in a rule editor user interface and modifying 1206 user interface controls of rule components displayed in the rule editor user interface according to respective associated tag definitions. In some embodiments, modifying 1206 the user interface controls enforces the limits of the associated tag definitions on how rule components may be modified by the rule administrator.

Figure 13:
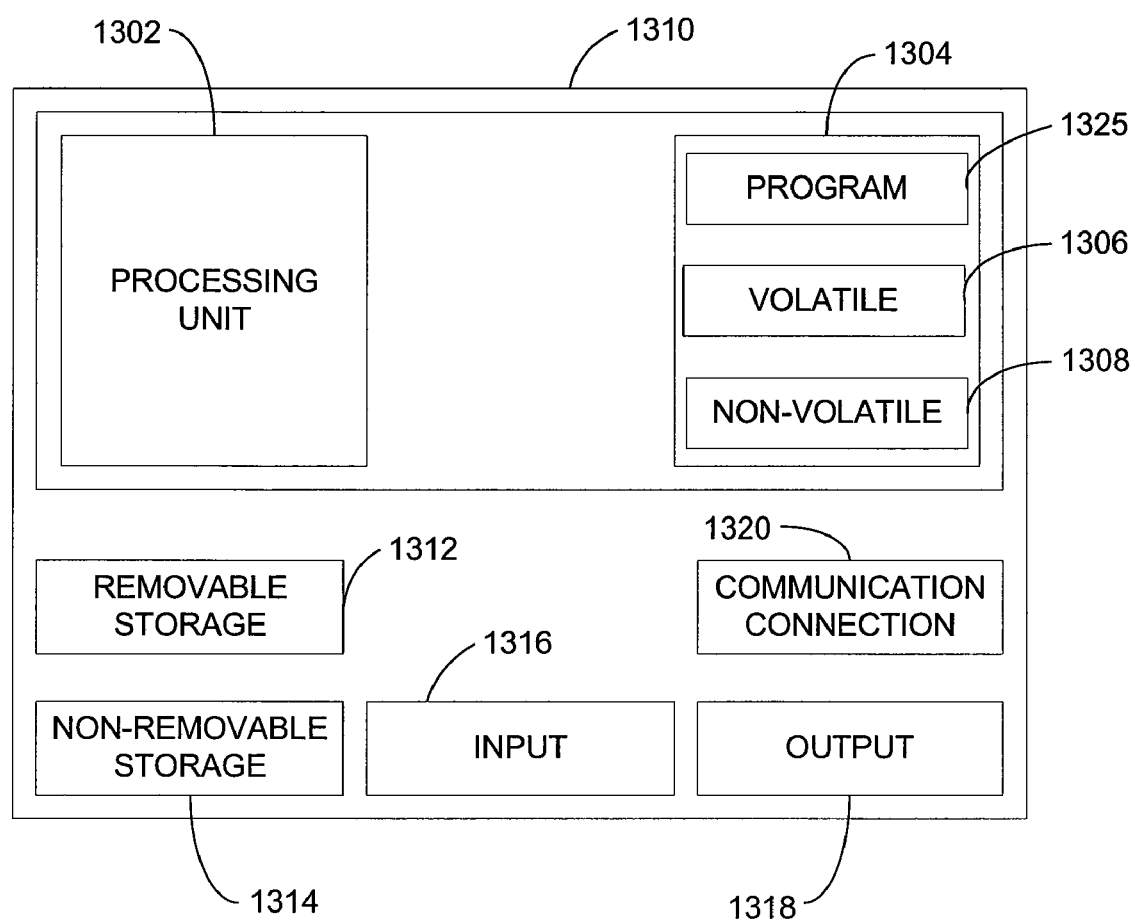
FIG. 13 is a block diagram of a computing device according to an example embodiment.

FIG. 13 is a block diagram of a computing device according to an example embodiment. In one embodiment, multiple such computer systems are utilized in a distributed network to implement multiple components in a transaction based environment. An object oriented, service oriented, or other architecture may be used to implement such functions and communicate between the multiple systems and components. One example computing device in the form of a computer 1310, may include one or more processing units 1302, memory 1304, removable storage 1312, and non-removable storage 1314. Memory 1304 may include volatile memory 1306 and non-volatile memory 1308. Computer 1310 may include—or have access to a computing environment that includes—a variety of computer-readable media, such as volatile memory 1306 and non-volatile memory 1308, removable storage 1312 and non-removable storage 1314. Computer storage includes random access memory (RAM), read only memory (ROM), erasable programmable read-only memory (EPROM) & electrically erasable programmable read-only memory (EEPROM), flash memory or other memory technologies, compact disc read-only memory (CD ROM), Digital Versatile Disks (DVD) or other optical disk storage, magnetic cassettes, magnetic tape, magnetic disk storage or other magnetic storage devices, or any other medium capable of storing computer-readable instructions. Computer 1310 may include or have access to a computing environment that includes input 1316, output 1318, and a communication connection 1320. The computer may operate in a networked environment using a communication connection to connect to one or more remote computers, such as database servers. The remote computer may include a personal computer (PC), server, router, network PC, a peer device or other common network node, or the like. The communication connection may include a Local Area Network (LAN), a Wide Area Network (WAN) or other networks.

Computer-readable instructions stored on a computer-readable medium are executable by the processing unit 1302 of the computer 1310. A hard drive, CD-ROM, and RAM are some examples of articles including a computer-readable medium. For example, a computer program 1325 which is executable by the processing unit 1302 to implement one or more of the embodiments described herein.

Another embodiment is in the form of a system. The system of such embodiments includes a processor, one or more memory devices, a database held in at least one of the memories, and a rule administration program executable by the processor and stored in at least one of the memory devices.

The database in such embodiments holds data representative of rule definitions, tag definitions, associations of tag definitions to components of rules, and rule administrator records. The rule definitions of each rule may include one or more rule components. The rule components may individually include a reference to one or more values from which an inference is made when the rule is applied. The tag definitions when associated with a rule component limit how the rule component may be modified.

The rule administration program is executable by the processor in some embodiments to provide one or more rule administration user interfaces. Such rule administration user interfaces may be operable to receive input to define and modify the rule definitions and the associations of the tag definitions to the rule components. The rule administration program may be further operable to enforce the limits of tag definitions associated with rule components by limiting how rule components may be modified within the one or more rule administration user interfaces as a function of a rule administrator identifier.

It is emphasized that the Abstract is provided to comply with 37 C.F.R. §1.72(b) requiring an Abstract that will allow the reader to quickly ascertain the nature and gist of the technical disclosure. It is submitted with the understanding that it will not be used to interpret or limit the scope or meaning of the claims.

In the foregoing Detailed Description, various features are grouped together in a single embodiment to streamline the disclosure. This method of disclosure is not to be interpreted as reflecting an intention that the claimed embodiments of the inventive subject matter require more features than are expressly recited in each claim. Rather, as the following claims reflect, inventive subject matter lies in less than all features of a single disclosed embodiment. Thus, the following claims are hereby incorporated into the Detailed Description, with each claim standing on its own as a separate embodiment.

It will be readily understood to those skilled in the art that various other changes in the details, material, and arrangements of the parts and method stages which have been described and illustrated in order to explain the nature of the inventive subject matter may be made without departing from the principles and scope of the inventive subject matter as expressed in the subjoined claims.

What is claimed is:

1. A computerized method comprising:
   receiving a rule definition in a system, the rule definition including one or more rule components, each component including a reference to one or more values from which an inference is made when the rule is applied;
   associating one or more rule components with one or more tag definitions that limit how the one or more associated rule components are modifiable by one or more rule administrators based on an administrator identity, the limiting of one or more rule component modifications with the one or more tag definitions including a tag definition specifying a subset of available rule component values from the one or more values defined in the rule definition, the tag definition including a verb that identifies how the tag modifies data of the available rule component values to form the subset of available rule component values; and
   storing the rule definition and the associations of tag definitions to the rule components in a data store.

2. The computerized method of claim 1, further comprising:
   retrieving the rule definition and associated tag definitions from the data store as a function of a query including an identifier of a rule administrator;
   instantiating the rule definition in a rule editor user interface;
   modifying user interface controls of rule components displayed in the rule editor user interface according to respective associated tag definitions; and
   wherein the modifying of the user interface controls is consistent with the limits of the associated tag definitions on how rule components may be modified by the rule administrator.

3. The computerized method of claim 1, wherein a rule component of the rule definition includes an association to one or more tag definitions.

4. The computerized method of claim 1, wherein the rule definition is received via a rule editor user interface.

5. The computerized method of claim 1, wherein associating one or more rule components with one or more tag definitions with includes:
   conditionally associating one or more rule components with one or more tag definitions.

6. The computerized method of claim 5, wherein conditionally associating one or more rule components with one or more tag definitions includes a conditional operation as a function of an identifier of a rule administrator.

7. The computerized method of claim 1, wherein the rule definition, one or more tag definitions, and associations of tag definitions to rule components are stored in the data store in a markup language or other format which associates rule display and modification functionality within a rule editor user interface.

8. A system comprising:
   a processor;
   one or more memory devices;
   a data store held in at least one of the memory devices, the data store comprising:
      rule definitions, each rule including one or more rule components, each rule component including a reference to one or more values from which an inference is made when the rule is applied;
      tag definitions which when associated with a rule component limit how the rule component may be modified, the limiting of one or more rule component modifications with the one or more tag definitions including a tag definition specifying a subset of available rule component values from the one or more values defined in the rule definition, the tag definitions each including at least one verb that identifies how the tag modifies data of the available rule component values to form the subset of available rule component values;
      associations of tag definitions to rule components of the rule definitions; and
      rule administrator records, each rule administrator record including a rule administrator identifier;
   a rule administration program in at least one of the memory devices and operable on the processor to:
      provide one or more rule administration user interfaces, the rule administration user interfaces operable to receive input to define and modify the rule definitions and the associations of the tag definitions to the rule components; and
      implementing the limits of tag definitions associated with rule components by limiting how rule components may be modified within the one or more rule administration user interfaces as a function of a rule administrator identifier.

9. The system of claim 8, wherein rule definitions define rules operable within an expert system.

10. The system of claim 8, wherein a rule component is associated to one or more tag definitions.

11. The system of claim 8, wherein a rule component is conditionally associated with one or more tag definitions.

12. The system of claim 11, wherein the conditional association of the rule component with the one or more tag definitions is determined as a function of an administrator identifier.

13. The system of claim 8, wherein the rule administration program is further operable to:

allow a first user to generate the rule definition and associate tag definitions to the rule components to limit how a second user is allowed to modify the rule definition.

14. The system of claim 13, wherein a modification of the rule definition by the second user is stored in the data store as another rule definition instantiated as a function of the rule definition.

15. The system of claim 14, wherein the another rule definition is stored in the data store with reference to the rule definition and includes data identifying modifications made to the rule definition.

16. A computer-readable medium, with instructions thereon which when processed cause a computer to:
  receive a rule definition, the rule definition including one or more rule components, each component including a reference to one or more values from which an inference is made when the rule is applied;
  receive input associating one or more rule components with one or more tag definitions that limit modifications by one or more rule administrators to the one or more associated rule components based on an administrator identity, the limiting of one or more rule component modifications with the one or more tag definitions including a tag definition specifying a subset of available rule component values from the one or more values defined in the rule definition, the tag definition including a verb that identifies how the tag modifies data of the available rule component values to form the subset of available rule component values;
  store the rule definition and the associations of tag definitions to the rule components in a data store;
  retrieve the rule definition and associated tag definitions from the data store as a function of a query including an identifier of a rule administrator;
  instantiate the rule definition in a rule editor user interface;
  modify user interface controls of rule components displayed in the rule editor user interface according to respective associated tag definitions to enforce the limits of the associated tag definitions on how rule components may be modified by the rule administrator.

17. The computer-readable medium of claim 16, wherein a rule component of the rule definition includes an association to at least one tag definition.

18. The computer-readable medium of claim 16, wherein the input received to associate one or more rule components with one or more tag definitions with includes:
  receiving input to conditionally associate one or more rule components with one or more tag definitions.

19. The computer-readable medium of claim 18, wherein the received input conditionally associating one or more rule components with one or more tag definitions includes receiving input defining a conditional operation that is conditional as a function of an identifier of a rule administrator.

20. The computer-readable medium of claim 16, wherein the rule definition, one or more tag definitions, and associations of tag definitions to rule components are stored in the data store in a format which associates rule display and modification functionality within a rule editor user interface.

* * * * *